United States Patent
Koshy

(10) Patent No.: US 10,545,788 B2
(45) Date of Patent: Jan. 28, 2020

(54) PHYSICAL TO VIRTUAL SCHEDULING SYSTEM AND METHOD

(71) Applicant: VMware, Inc., Palo Alto, CA (US)

(72) Inventor: Mathew P. Koshy, Palatine, IL (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/792,326

(22) Filed: Oct. 24, 2017

(65) Prior Publication Data

US 2018/0189095 A1 Jul. 5, 2018

Related U.S. Application Data

(63) Continuation of application No. 12/785,669, filed on May 24, 2010, now Pat. No. 9,798,573.

(60) Provisional application No. 61/180,704, filed on May 22, 2009.

(51) Int. Cl.
*G06F 9/46* (2006.01)

(52) U.S. Cl.
CPC ..................... *G06F 9/46* (2013.01)

(58) Field of Classification Search
CPC .......................................................... G06F 9/46
See application file for complete search history.

(56) References Cited

U.S. PATENT DOCUMENTS

| | | | |
|---|---|---|---|
| 7,330,997 B1 | 2/2008 | Odom | |
| 7,356,679 B1 * | 4/2008 | Le | G06F 17/30067 713/1 |
| 7,809,905 B2 | 10/2010 | Maruyama et al. | |
| 2004/0111726 A1 * | 6/2004 | Dilley, Jr. | G06F 16/214 719/310 |
| 2006/0107087 A1 | 5/2006 | Sieroka et al. | |
| 2008/0155537 A1 * | 6/2008 | Dinda | G06F 9/4887 718/1 |
| 2008/0201542 A1 * | 8/2008 | Maruyama | G06F 3/0607 711/165 |
| 2009/0210427 A1 | 8/2009 | Eidler et al. | |
| 2009/0249284 A1 * | 10/2009 | Antosz | G06F 8/10 717/104 |
| 2009/0292888 A1 | 11/2009 | Srivastava et al. | |
| 2009/0327632 A1 | 12/2009 | Glaizel et al. | |
| 2010/0005337 A1 | 1/2010 | Bensinger | |
| 2010/0011178 A1 | 1/2010 | Feathergill | |
| 2010/0180275 A1 | 7/2010 | Neogi et al. | |
| 2010/0228913 A1 | 9/2010 | Czezatke et al. | |
| 2011/0214013 A1 | 9/2011 | Bensinger | |

* cited by examiner

*Primary Examiner* — Kurtis Gills

(74) *Attorney, Agent, or Firm* — Patterson + Sheridan, LLP

(57) ABSTRACT

Large-scale data migration processes are managed using a schedule optimizer implemented in software. The schedule optimizer assigns an available data migration window to each server in an inventory of servers based on a scheduling priority determined for that server. For example, servers that have manually scheduled conversion dates are assigned the highest scheduling priority, and servers that have a migration deadline are assigned the next highest scheduling priority. In addition, servers may grouped and data migration may be scheduled for server groups instead of individual servers.

17 Claims, 6 Drawing Sheets

PHYSICAL TO VIRTUAL SCHEDULING SYSTEM AND METHOD

CROSS-REFERENCE TO RELATED APPLICATION(S)

This application is a continuation of U.S. patent application Ser. No. 12/785,669, filed May 24, 2010, which claims the benefit of U.S. Provisional Patent Application No. 61/180,704, filed May 22, 2009, all of which are hereby incorporated by reference in their entirety.

BACKGROUND OF THE INVENTION

As data storage systems become ever bigger, providing efficient backup storage becomes increasingly important. Backups can be used for a variety of purposes. They can be used to recover from user error when, for example, the user inadvertently deletes or overwrites a file. They can be used to recover from data loss due to hardware failure such as a hard disk failure. They can also be used to recover from software failures such as application or operating system crashes. The goal of recovery after a crash is to restore the last available known good operating state for the complete system. This can be done by rebooting the same hardware after restoring the file system from a suitable backup, but the recovery procedure can be very time-consuming if the entire file system must be restored. For this reason, virtual machines (VMs) are sometimes used for backup purposes. When a VM is used for backup purposes, it is typically not used as a running machine unless and until it is needed for restoring a failed machine. Typically, the VM is launched, booted, and tested only to verify functionality and then it is shut down; however, it can be brought back on-line quickly if and when needed to replace the failed source machine for which it is functioning as a backup.

As such, if a VM is used as a backup and the source machine goes down, the VM can be quickly powered on in its place. Whereas a full system restore from traditional backup methods can take hours, the VM can be up and running in a few minutes. Examples of commercial products that enable VMs to be used for backup include POWERCONVERT® from PLATESPIN®, Ltd., VEEAM BACKUP™ from Veeam Software, and VMWARE CONVERTER™ and P2VMOTION™ from VMware, Inc. The conversion from a source computing machine to a VM is commonly referred to as "P2V conversion" (physical-to-virtual conversion). Various implementations and features of the P2V conversion process are disclosed in U.S. patent application Ser. No. 12/197,768, filed on Aug. 25, 2008, U.S. patent application Ser. No. 12/616,902, filed on Nov. 12, 2009, and U.S. patent application Ser. No. 12/618,280, filed on Nov. 13, 2009. The entire contents of these three applications are incorporated by reference herein.

The full P2V conversion process for a source machine can take several hours, if not days. Because of this, the management of such conversions becomes very difficult in situations where there are a large number of source machines to be converted, e.g., in server farms, and/or there are only a limited number of days to complete the conversion. Other factors, such as the limited availability of personnel with the appropriate expertise to oversee the conversions, may further complicate the management of P2V conversions.

SUMMARY OF THE INVENTION

One or more embodiments of the present invention provide a tool to manage large-scale data migration processes. In particular, one or more embodiments of the present invention provide a system and method for scheduling an inventory of source servers for P2V conversion.

A physical-to-virtual conversion system, according to an embodiment of the invention, includes a plurality of source servers, one or more backup servers having virtual machines instantiated therein, a physical-to-virtual conversion system for migrating data of the source servers to the virtual machines instantiated in the backup servers, and a scheduling system that is configured to schedule data migration of the source servers to the virtual machines in accordance with a hierarchically arranged set of criteria.

A method of scheduling physical-to-virtual conversion of a plurality of source servers to virtual machines, according to an embodiment of the invention, includes the steps of assigning a first priority to those source servers that have manually scheduled conversion dates, assigning a second priority to those source servers that have a deadline for physical-to-virtual conversion, assigning lower priorities to other source servers, and scheduling, by a processor, data migration of the source servers to the virtual machines according to the assigned priorities.

Additional embodiments of the present invention provide a computer-readable storage medium containing instructions for causing a computer system to carry out the above method.

DETAILED DESCRIPTION

As is well known, a virtual machine (VM) is a software abstraction, or "virtualization," of an actual physical computer system. A VM typically has a "guest" operating system (OS) of its own such as, for example, a WINDOWS® OS, a LINUX OS, or an OS-X OS.

One or more embodiments of the present invention relate to methods for scheduling backups of source computing machines or source systems, which may be either physical machines or VMs, using VMs. The full backup procedure is carried out by converting the source system, including all or selected storage volumes thereof, to a VM without interrupting the activities of the source system.

Figure 1:
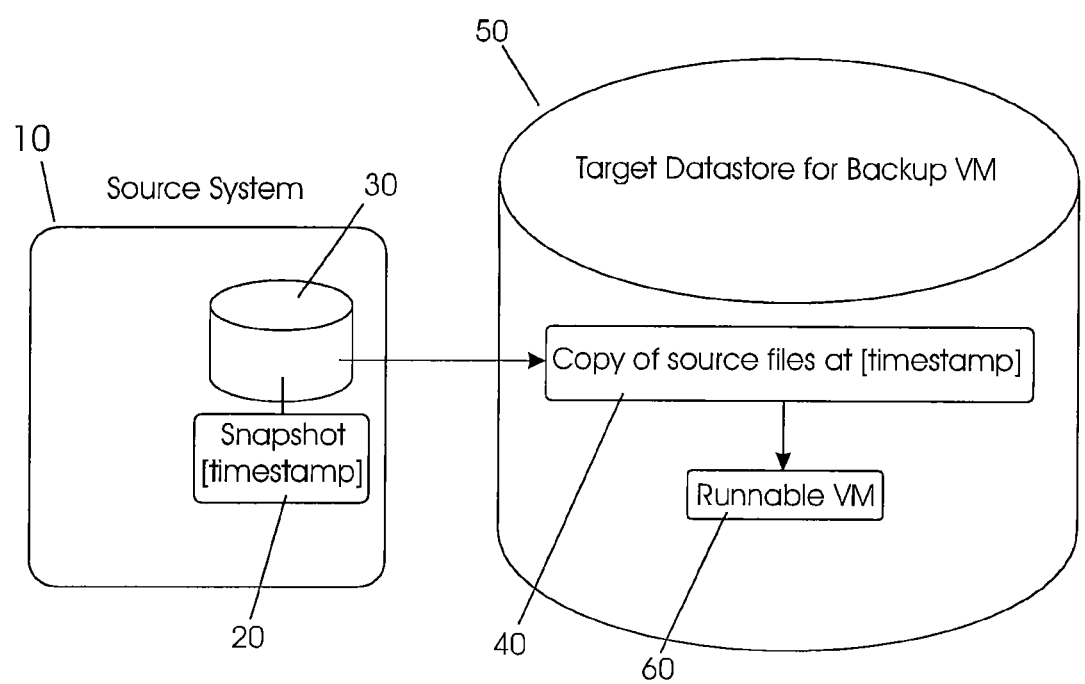
FIG. 1 helps illustrate steps involved in converting a running source system to a virtual machine.

FIG. 1 shows schematically the conversion of running source system 10 to a VM. As shown in FIG. 1, the conversion comprises steps of: (a) creating source snapshot 20 of source system storage volume 30, which may be all or a subset of volumes accessed by source system 10; (b) creating a storage location 40 on target datastore 50 for a copy of source system storage volume 30 as it existed at the time defined by source snapshot 20, wherein the target datastore 50 can be accessed by a computing machine (not shown for ease of illustration) that will host the backup VM;

(c) copying data specified by source snapshot 20 to source copy 40 on target datastore 50; (d) reconfiguring and customizing source copy 40 to create runnable VM 60; and (f) storing runnable VM 60 on target datastore 50.

Source snapshot 20 may be created using any technically feasible method. Source snapshot 20 captures the state of source system 10 volumes at a point in time. As is well known, a "volume" is a portion of a storage medium such as a disk (physical or virtual) that is treated as a unit by an operating system. For example, in WINDOWS operating systems, volumes are designated by "drive" letters. In addition, a "snapshot" of a volume represents an image of the complete state of a volume at a point in time. A snapshot is usually not a physical copy, since it is undesirable to stop a running machine while a physical copy is made. Instead, a snapshot operation itself usually comprises recording a timestamp, and, thereafter, preserving pre-snapshot versions of all files, including subsequently deleted files. In normal operation, the operating system and application software see only the new version of the file system, including all changed and deleted files, and preserved presnapshot versions of files are made available via a special interface. When used in carrying out a backup procedure, a "source snapshot" is typically transient, and it is deleted after completion of the backup procedure. After a source snapshot is created, the source system continues to write to volume(s) as usual, but any previously-used blocks which would be overwritten are copied into a snapshot file so that they are not lost and can be retrieved via the special interface.

The source machine may be a VM that is running. The same snapshot methods used for a physical machine can also be used. Alternatively, the host machine for the source VM can create the snapshot file outside of the source VM using additional data storage outside that allocated for the running source VM.

Figure 2:
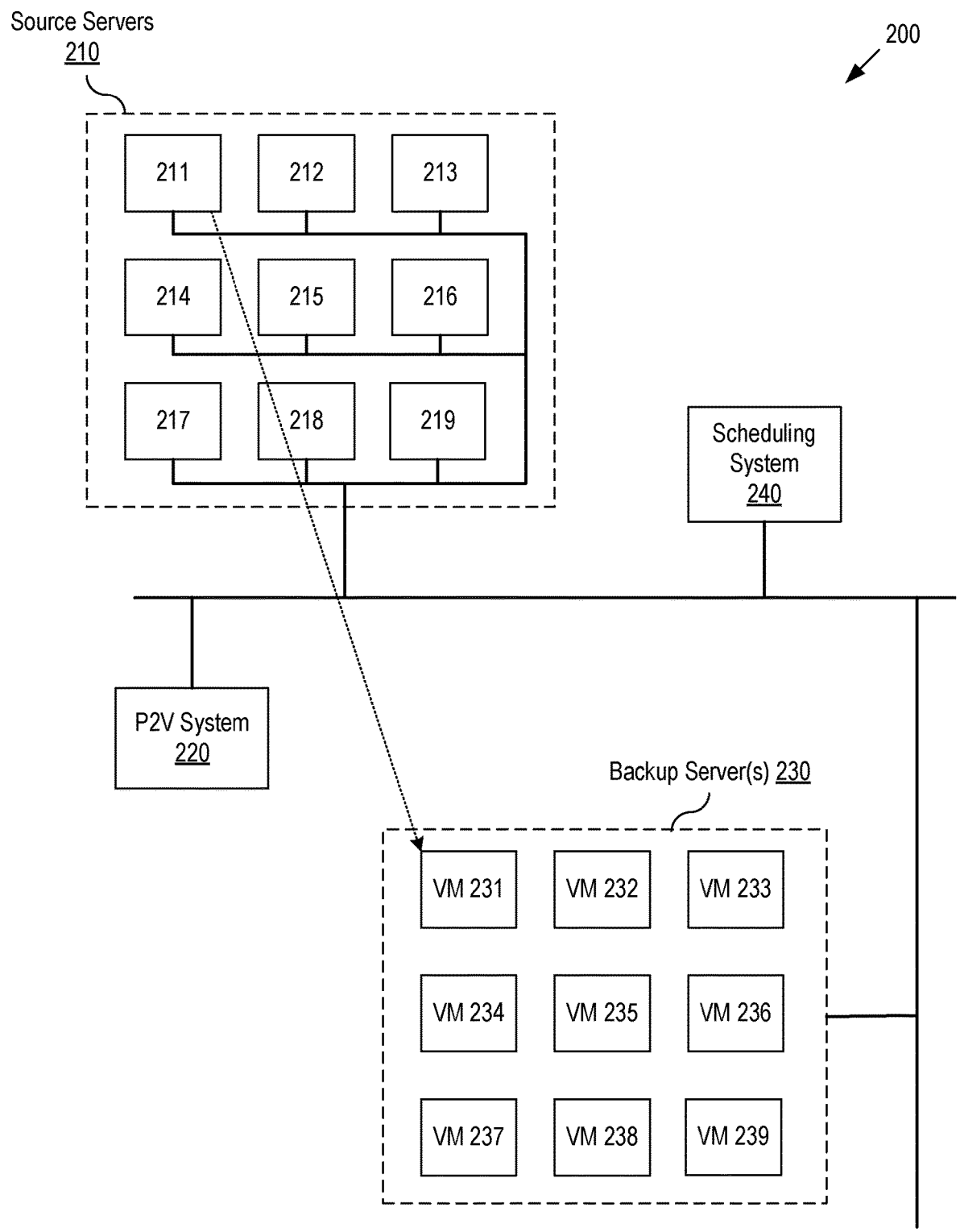
FIG. 2 is a block diagram of a physical-to-virtual system in which one or more embodiments of the invention can be implemented.

FIG. 2 is a block diagram of a physical-to-virtual conversion and scheduling system 200 in which one or more embodiments of the invention can be implemented. System 200 includes a P2V system 220 that performs the P2V conversion on source machines 210, which in this example are servers 211-219, to VMs running in one or more backup servers 230, and a scheduling system 240 that schedules the P2V conversions. In the embodiments of the invention, both P2V system 220 and scheduling system 240 are implemented as a computer system and include conventional components of a computer system such as one or more processing units and system memory. P2V system 220 is programmed to carry out the P2V conversion process described above in conjunction with FIG. 1, or alternatively implements any of the P2V conversion software known in the art, such as VMware Converter from VMware, Inc. Scheduling system 240 is programmed to carry out the scheduling process according to one or more embodiments of the invention, which are further described below. Although P2V system 220 and scheduling system 240 are illustrated as separate elements in FIG. 2, they may reside within a single computer system, e.g., a single server, workstation, or even a VM.

In the illustrated system 200, the servers 211-219 are respectively converted into VMs 231-239 that are running in one or more backup servers 230. An arrow is shown in FIG. 2 to indicate that a P2V conversion is performed on server 211 and running as VM 231. In the embodiments of the invention, one or more backup servers 230 may support VMs 231-239, and any number of VMs 231-239 may be running in any one of the backup servers 230.

Figure 3:
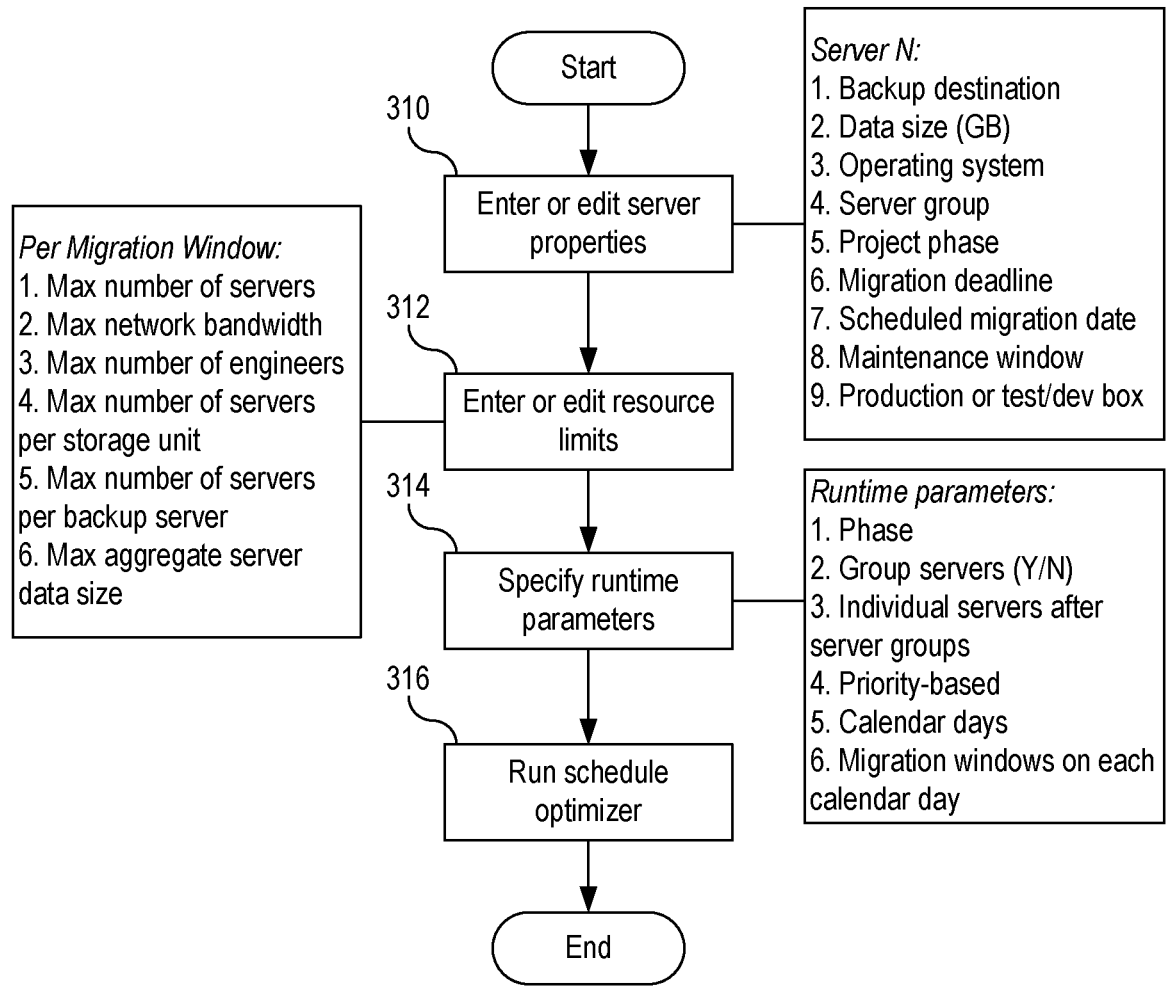
FIG. 3 is a schematic diagram of a P2V scheduling system according to an embodiment of the invention.
Figure 4A:
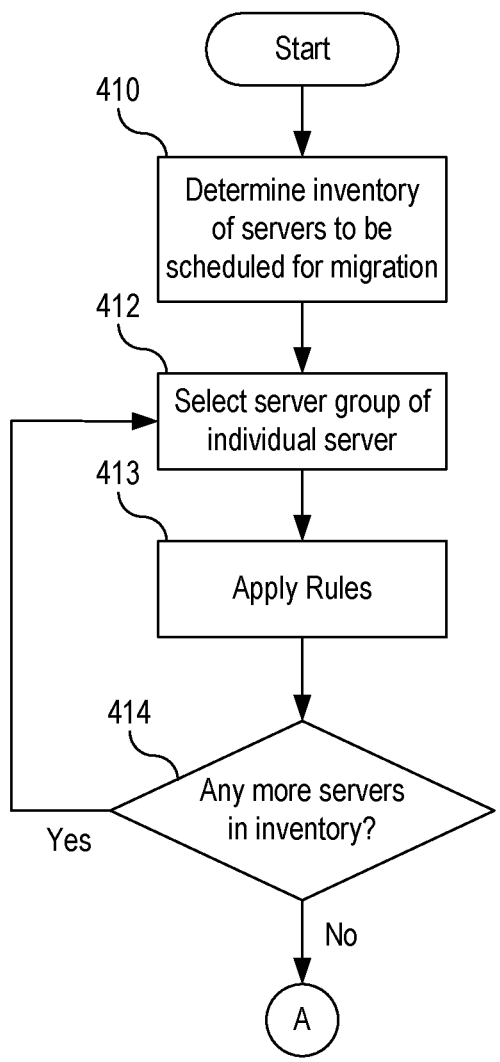
FIGS. 4A and 4B are flow diagrams that illustrate in more detail one of the steps of the P2V scheduling method according to an embodiment of the invention.
Figure 4B:
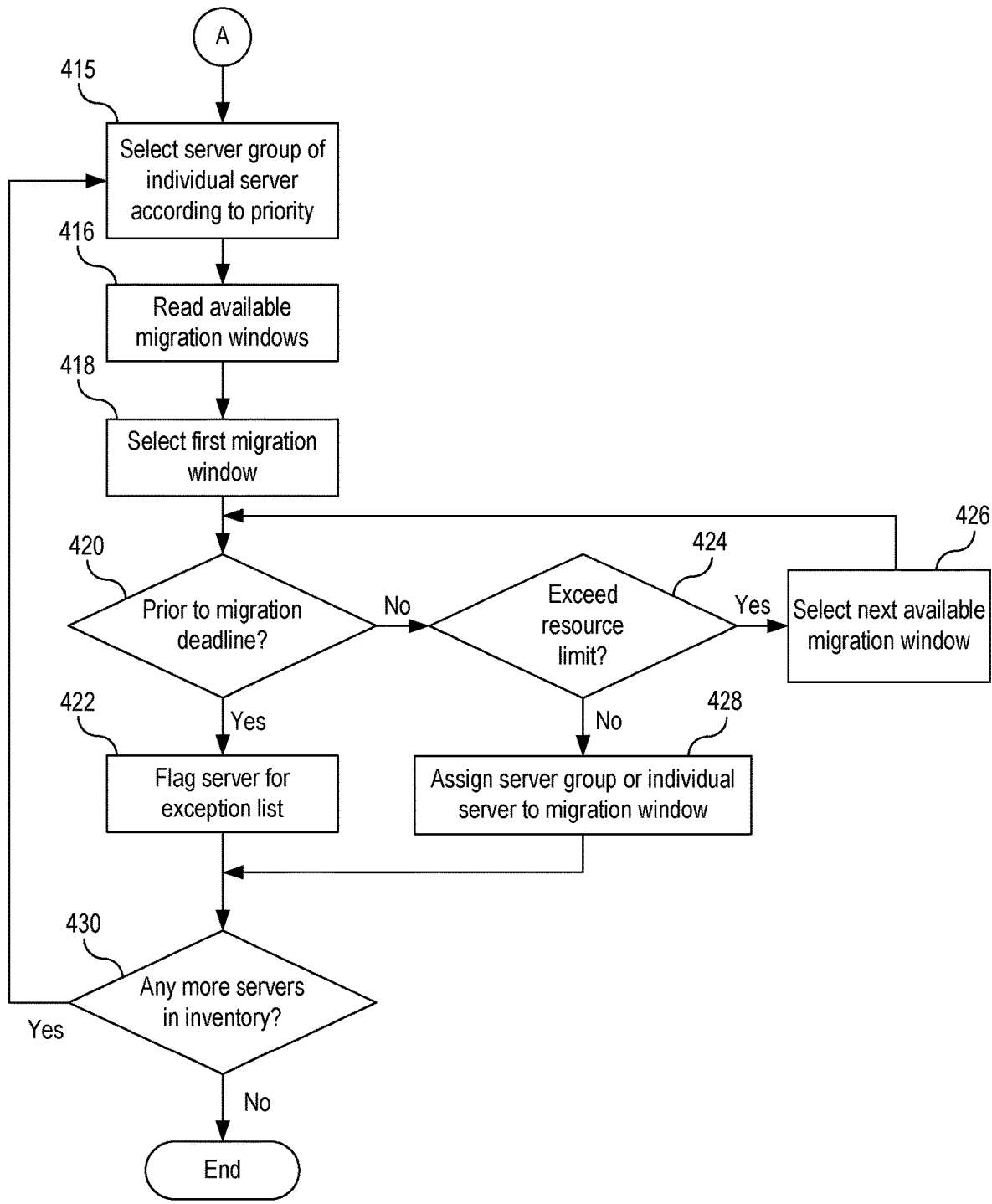

The scheduling process carried out by scheduling system 240 is illustrated in FIGS. 3 and 4. FIG. 3 is a schematic diagram of a P2V scheduling system according to an embodiment of the invention. FIGS. 4A and 4B are flow diagrams that illustrate in more detail one of the steps of the P2V scheduling method according to an embodiment of the invention.

In accordance with one or more embodiments of the invention, a schedule optimizer, which comprises computer software code, is provided in scheduling system 240. Schedule optimizer provides a novel method of scheduling the P2V conversion (also referred to herein as "P2V migration" or "migration") of computer server data which in their current state operate on servers 211-219 to VMs 231-239.

The scheduling process shown in FIG. 3 begins with three input/edit steps, step 310, 312, and 314. At step 310, properties or characteristics of the source machines are input or edited. At step 312, limits or constraints on the physical resources that are carrying out the migration are input or edited. At step 314, the runtime parameters of the scheduling process are specified. After all of the inputs or edits have been made, the schedule optimizer is executed in step 316 based on the source machine properties, resource limits or constraints, and runtime parameters, as input or edited.

The source machine properties are specified for each source machine and include the following data: an address of the backup server to which the source machine data is being migrated, data size of the source machine data, operating system used by the source machine, group/phase identifier if the source machine is part of a group or phase, any migration deadline or scheduled migration date, a maintenance window, an indication as to whether the source machine has been approved for migration, and an indication as to whether the source machine is a production box or a test/dev box. These source machine properties are illustrative and other properties may be specified.

The resource limits are defined per migration window, which is defined as a finite time period, e.g., 8 hours. The resource limits include: maximum number of source machines that can be migrated, maximum network bandwidth available, maximum number of engineers of the appropriate skill level available (e.g., when migrating a Linux-based server, engineers familiar with the Linux OS need to be made available), maximum number of source machines per storage unit on the backup side, maximum number of source machines per backup server, and maximum aggregate data size of the source machines. These resource limits are illustrative and other resource limits may be specified.

The runtime parameters are defined per optimization run. The first runtime parameter is a phase input. If a phase is input, only source machines that are part of this phase are scheduled for migration. The second runtime parameter is an input indicating whether source servers should be grouped. If this input is made, the source machines of a group are scheduled for migration during the same migration window according to the source server in the group that has the highest priority. The third runtime parameter is an input indicating that individual source machines should be migrated only after source machines belonging to groups have been migrated. If this input is made, all of the source machines that belong to a group are scheduled for migration first and the source machines that do not belong to a group are scheduled for migration next. The fourth runtime parameter is an input indicating whether priority-based migration scheduling should be carried out. The priority-based migration scheduling is further described below in conjunction with FIGS. 4A-4B. The fifth and sixth runtime parameters are basic parameters and include calendar days on which migrations are to be scheduled and migration start and end times ("migration windows") on each calendar day.

Step 316 is the step of running the schedule optimizer. The details of this step are shown in FIGS. 4A and 4B. At step 410, an inventory of servers that are to be scheduled for migration is determined. This inventory may be filtered based on whether or not a phase has been designated in step 314. For example, if the complete inventory of servers includes servers that are part of Phase I and servers that are part of Phase II, and the phase designated in step 314 is Phase I, the determined inventory of servers will include servers that are part of Phase I and will not include servers that are part of Phase II. At step 412, a server group is selected if the second runtime parameter indicates that the servers should be grouped. Otherwise, an individual server is selected. At step 413, priority rules are applied. The priority rules may be applied in various ways. The following tables, TABLES 1 and 2, show two ways priority rules may be applied. In each of these two tables, a lower priority number correlates to a higher priority in migration scheduling.

TABLE 1

| Priority | Rule Name | Rule |
|---|---|---|
| Priority 0 | Manually Scheduled | Servers scheduled manually by user input for a specific migration window are assigned to that migration window regardless of other priorities. |
| Priority 1 | Migration Deadline | Servers with an established migration deadline are scheduled prior to servers that qualify for a higher-numbered priority rule and after servers that retain a lower-numbered priority rule. |
| Priority 2 | Tentative Migration Date | Servers assigned a tentative migration date are scheduled prior to servers that qualify for a higher-numbered priority rule, and after servers that retain a lower-numbered priority rule. |
| Priority 3 | Type Preference by Priority | Servers are scheduled according to server type according to a preferential order set for the different server types, after servers that qualify for a lower-numbered priority rule, and before servers that are not given a priority. |

TABLE 2

| Priority | Rule Name | Rule |
|---|---|---|
| Priority 0 | Manually Scheduled | Servers scheduled manually by user input for a specific migration window are assigned to that migration window regardless of other priorities. |
| Priority 1 | Migration Deadline | Servers with an established migration deadline are scheduled prior to servers that qualify for a higher-numbered priority rule and after servers that retain a lower-numbered priority rule. |
| Priority 2 | Maintenance Window | Servers with established maintenance windows are scheduled prior to servers without an established maintenance window, before servers that qualify for a higher-numbered priority rule and after servers that retain a lower-numbered priority rule. |
| Priority 3 | Server Type | Servers are scheduled according to server type according to a preferential order set for the different server types, before servers that retain a higher-numbered priority rule and after servers that qualify for a lower-numbered priority rule. |
| Priority 4 | Completion of Key Data | Servers with key data elements complete are scheduled after servers that qualify for a lower-numbered priority rule and before servers that retain a higher-numbered priority rule. Key data elements include identification of backup server and whether or not the source |

TABLE 2-continued

| Priority | Rule Name | Rule |
|---|---|---|
| | | server has been approved for migration. |
| Priority 5 | General Inventory | Servers in general inventory are scheduled after all servers that qualify for lower-numbered priority rules. |

All servers and server groups having Priority 0 are scheduled for migration at step 413 at the time or near the time it is determined that they have Priority 0. All other servers and server groups are scheduled for migration after priority rules have been applied at step 413 to all servers in the inventory. Step 414 checks to see if all servers in the inventory have been processed. If not, flow returns to step 412, where another server group or individual server is selected for priority rule processing. After the priority rules have been applied to all servers in the inventory, flow proceeds to step 415.

At step 415, a source server or server group is selected according to priority. For example, all Priority 1 servers or server groups are processed first and then Priority 2 servers or server groups, and so forth. At step 416, all available migration windows are read. Then, at step 418, the first available migration window is selected for possible scheduling. A check is made at step 420 to see the migration window is prior to the migration deadline associated with the server or server group being processed. If, according to the check at step 420, the migration window is prior to the migration deadline associated with the server or server group being processed, a check is made at step 424 to see if any of the resource limits specified in step 312 has been exceeded. If so, the next available migration window for migration is selected at step 426 and the flow returns to step 420. If the check at step 420 indicates that the migration window is not prior to the migration deadline, the server or server group selected at step 415 are flagged for inclusion in an exception list (step 422). If, according to the check at step 424, no resource limit has been exceeded, the server or server group selected at step 415 is assigned to the migration window selected at step 418 or step 426, as the case may be. Step 430 checks to see if all servers in the inventory have been processed. If not, flow returns to step 415, where another server group or individual server is selected for scheduling. After all source servers in the inventory have been scheduled, the process ends.

In the case where the third runtime parameter specified in step 314 indicates that individual servers should be migrated after group servers, step 316 is carried out for server groups first and then it is carried out for individual servers.

In further embodiments of the invention, a manual re-optimization can be carried out by the operator for all servers that are scheduled after the current date and for migration windows that are also after the current date. In addition, an automatic re-optimization may be performed by the schedule optimizer in the event that any of the input parameters or resource limits changes.

Server types may be defined in any number of different ways and can be customized by the user. A server type may be based on operating system type. For example, a Linux-based server may be one server type while a Windows-based server may be another server type. An organization may want to group the migrations in this manner so that it can coordinate with Linux-based server field experts to be present during migration of Linux-based servers and with Windows-based server field experts to be present during migration of Windows-based servers.

In addition, migration scenarios may be specified as server types. For example, a user may want to group all of the migrations of Windows-based, production box, servers having less than 50 GB and prioritize these migrations over other server types. A second server type priority may be given to all Linux-based, test or development box servers of 200 GB and less.

Figure 5:
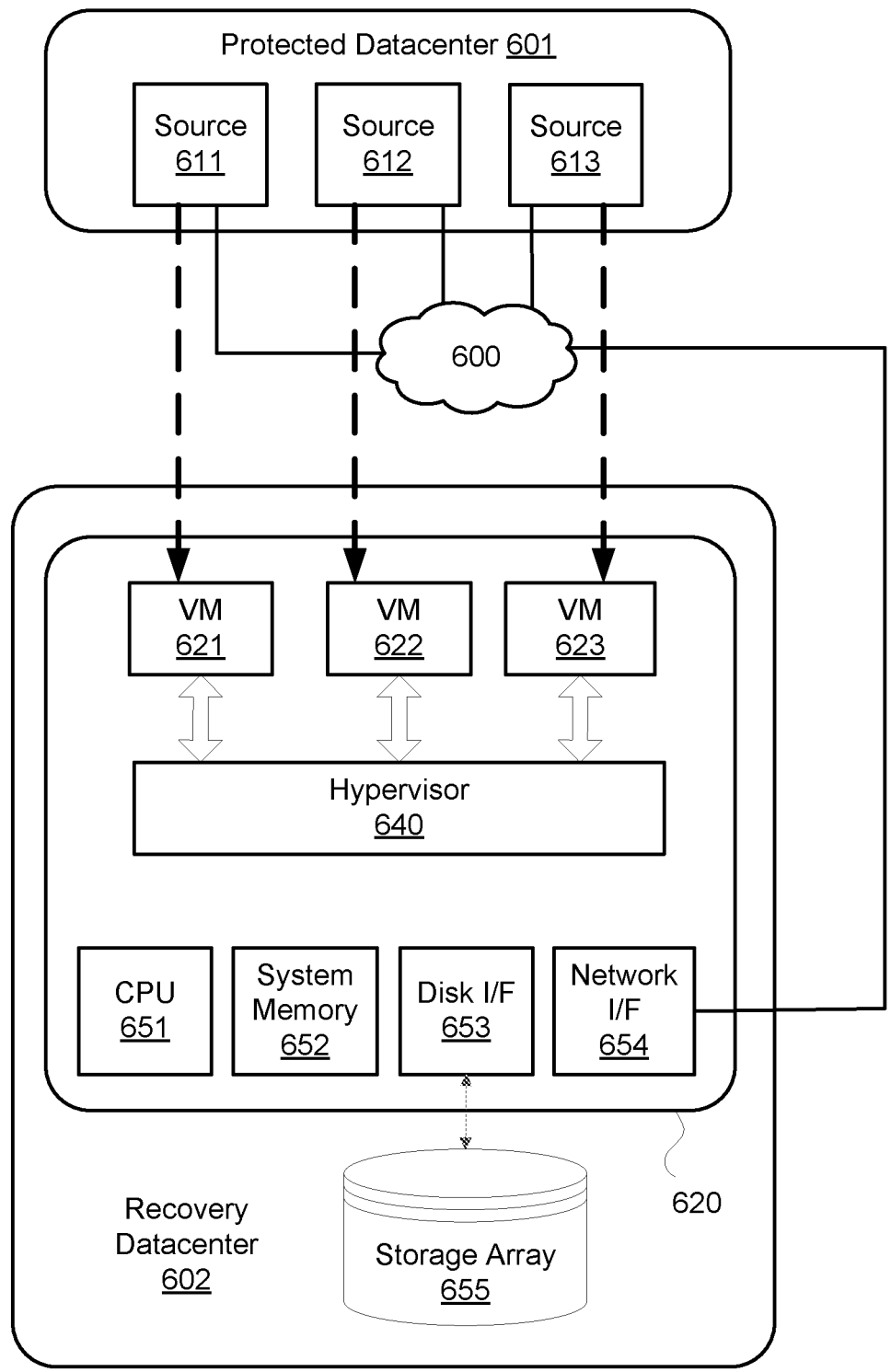
FIG. 5 is a block diagram of a physical-to-virtual disaster recovery system in which one or more embodiments of the invention can be implemented.

FIG. 5 is a block diagram of a physical-to-virtual disaster recovery (P2VDR) system in which one or more embodiments of the invention can be implemented. The P2VDR system includes two datacenters, datacenter 601 and datacenter 602, in separate geographical locations that are connected through a network 600. The recovery datacenter, which is datacenter 602, is far enough from the protected datacenter, which is datacenter 601, to qualify for disaster recovery. In one embodiment, the geographical separation is 100 km.

Protected datacenter 601 houses source machines referred to herein as source 611, source 612, and source 613. VM 621 is a backup of source 611. VM 622 is a backup of source 612. VM 623 is a backup of source 613. VM 621, VM 622, and VM 623 each run in a computer system 620 that is housed in recovery datacenter 602. In the embodiment of FIG. 6, three virtual machines and three source machines are shown. However, the invention is applicable to any number of virtual machines and source machines.

Computer system 620 is the host system for VM 621, VM 622, and VM 623, and has conventional hardware resources of a computing device, such as CPU 651, system memory 652, a disk interface 653, and network interface 654, that are shared by VM 621, VM 622, and VM 623. Examples of disk interface 653 are a host bus adapter and a network file system interface. An example of network interface 654 is a network adapter. The virtual machines, VM 621, VM 622, and VM 623, run on top of a hypervisor (or virtual machine monitor) 640, which is a software interface layer that enables sharing of the hardware resources of computer system 620 by the virtual machines. Hypervisor 640 may run on top of the host computer's operating system or directly on hardware components of the server platform. Data storage for computer system 620 is served by a storage array 655 (e.g., a disk array).

In the embodiments disclosed above, the source machines being tracked and the virtual machines that are serving as the backup are located in different datacenters, so that the physical-to-virtual backup system can qualify for disaster recovery. In an alternative embodiment, e.g., in situations where disaster recovery is not an objective, the source machines and the virtual machines may be located in the same datacenter. In addition, further embodiments of the invention may be employed for regular (non-disaster recovery) backups.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), such as CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A physical-to-virtual conversion system, comprising:
a plurality of source machines;
one or more physical servers having virtual machines instantiated therein, wherein each of the plurality of source machines is associated with a different one of the virtual machines; and
a computer system comprising one or more processing units and memory storing instructions that, when executed by the one or more processing units, enable:
a physical-to-virtual conversion system for migrating data of each of the plurality of source machines to the associated virtual machine instantiated in the one or more physical servers; and
a scheduling system that is configured to schedule data migration of the plurality of source machines to the virtual machines by assigning the plurality of source machines to one or more time periods for migration based on priority that is in accordance with a hierarchically arranged set of rules, wherein:
source servers that have been manually scheduled for physical-to-virtual conversion are scheduled for data migration first and accordingly assigned a first priority based on being manually scheduled instead of not being manually scheduled, thereby providing the first priority within the hierarchically arranged rules; and
source servers that have not been manually scheduled for physical-to-virtual conversion are scheduled for data migration second and accordingly assigned one of one or more second priorities based on not being manually scheduled instead of being manually scheduled, thereby providing the one or more second priorities within the hierarchically arranged rules.

2. The system of claim 1, wherein the scheduling system is configured to schedule the data migration in accordance with the hierarchically arranged set of rules based on one or more of one or more source machine properties of each of the plurality of source machines, one or more resource limits or constraints of physical resources that carry out the data migration, or one or more runtime parameters of the scheduling system.

3. The system of claim 2, wherein the scheduling system is configured to schedule the data migration in accordance with the hierarchically arranged set of rules based on the one or more source machine properties of each of the plurality of source machines, the one or more source machine properties comprising one or more of one or more addresses associated with the one or more physical servers, a data size of data of each of the plurality of source machines, an operating system of each of the plurality of source machines, a group identifier, a phase identifier, a migration deadline, a schedule migration date, or a maintenance window.

4. The system of claim 1, wherein the scheduling system is configured to schedule the data migration in accordance with the hierarchically arranged set of rules based on grouping of the plurality of source machines into groups.

5. The system of claim 1, wherein the scheduling system is configured to schedule the data migration of a source machine, at a time for scheduling said source machine, into a first available data time period of the one or more time periods.

6. The system of claim 1, wherein the set of rules comprise at least three hierarchically arranged rules.

7. A method of scheduling physical-to-virtual conversion of a plurality of source machines to virtual machines instantiated on one or more physical servers, each source machine associated with a different one of the virtual machines, the method comprising:
assigning, by a scheduling system of a computer system, the plurality of source machines to one or more time periods for migration based on priority that is in accordance with a hierarchically arranged set of rules to schedule data migration of the plurality of source machines to the virtual machines, the assigning comprising:
assigning, by the scheduling system, a first priority to those source servers that have been manually scheduled for physical-to-virtual conversion based on being manually scheduled instead of not being manually scheduled; and
assigning, by the scheduling system, a lower priority than the first priority to those source servers that have not been manually scheduled for physical-to-virtual conversion based on not being manually scheduled instead of being manually scheduled; and
migrating, by a physical-to-virtual conversion system of the computer system, data of each of the plurality of source machines to the associated virtual machine instantiated in the one or more physical servers during the assigned time period.

8. The method of claim 7, wherein the scheduling system is configured to schedule the data migration in accordance with the hierarchically arranged set of rules based on one or more of one or more source machine properties of each of the plurality of source machines, one or more resource limits or constraints of physical resources that carry out the data migration, or one or more runtime parameters of the scheduling system.

9. The method of claim 8, wherein the scheduling system is configured to schedule the data migration in accordance with the hierarchically arranged set of rules based on the one or more source machine properties of each of the plurality of source machines, the one or more source machine properties comprising one or more of one or more addresses associated with the one or more physical servers, a data size of data of each of the plurality of source machines, an operating system of each of the plurality of source machines, a group identifier, a phase identifier, a migration deadline, a schedule migration date, or a maintenance window.

10. The method of claim 7, wherein the scheduling system is configured to schedule the data migration in accordance with the hierarchically arranged set of rules based on grouping of the plurality of source machines into groups.

11. The method of claim 7, wherein the scheduling system is configured to schedule the data migration of a source machine, at a time for scheduling said source machine, into a first available data time period of the one or more time periods.

12. The method of claim 7, wherein the set of rules comprise at least three hierarchically arranged rules.

13. A non-transitory computer-readable storage medium containing instructions for causing a computer system to carry out a method of scheduling physical-to-virtual conversion of a plurality of source machines to virtual machines instantiated on one or more physical servers, each source machine associated with a different one of the virtual machines, the method comprising:

assigning, by a scheduling system of the computer system, the plurality of source machines to one or more time periods for migration based on priority that is in accordance with a hierarchically arranged set of rules to schedule data migration of the plurality of source machines to the virtual machines, the assigning comprising:

assigning, by the scheduling system, a first priority to those source servers that have been manually scheduled for physical-to-virtual conversion based on being manually scheduled instead of not being manually scheduled; and assigning, by the scheduling system, a lower priority than the first priority to those source servers that have not been manually scheduled for physical-to-virtual conversion based on not being manually scheduled instead of being manually scheduled; and migrating, by a physical-to-virtual conversion system of the computer system, data of each of the plurality of source machines to the associated virtual machine instantiated in the one or more physical servers during the assigned time period.

14. The non-transitory computer-readable storage medium of claim 13, wherein the scheduling system is configured to schedule the data migration in accordance with the hierarchically arranged set of rules based on one or more of one or more source machine properties of each of the plurality of source machines, one or more resource limits or constraints of physical resources that carry out the data migration, or one or more runtime parameters of the scheduling system.

15. The non-transitory computer-readable storage medium of claim 14, wherein the scheduling system is configured to schedule the data migration in accordance with the hierarchically arranged set of rules based on the one or more source machine properties of each of the plurality of source machines, the one or more source machine properties comprising one or more of one or more addresses associated with the one or more physical servers, a data size of data of each of the plurality of source machines, an operating system of each of the plurality of source machines, a group identifier, a phase identifier, a migration deadline, a schedule migration date, or a maintenance window.

16. The non-transitory computer-readable storage medium of claim 13, wherein the scheduling system is configured to schedule the data migration in accordance with the hierarchically arranged set of rules based on grouping of the plurality of source machines into groups.

17. The non-transitory computer-readable storage medium of claim 13, wherein the scheduling system is configured to schedule the data migration of a source machine, at a time for scheduling said source machine, into a first available data time period of the one or more time periods.

* * * * *